US012518915B2

(12) United States Patent
Duval et al.

(10) Patent No.: US 12,518,915 B2
(45) Date of Patent: Jan. 6, 2026

(54) ROTARY TRANSFORMER AND ROTATING MACHINE COMPRISING SUCH A ROTARY TRANSFORMER

(71) Applicants: SAFRAN AIRCRAFT ENGINES, Paris (FR); SAFRAN ELECTRICAL & POWER, Blagnac (FR)

(72) Inventors: Cedric Arnaud Henri Duval, Moissy-Cramayel (FR); Rachid Belfkira, Moissy-Cramayel (FR)

(73) Assignees: SAFRAN AIRCRAFT ENGINES, Paris (FR); SAFRAN ELECTRICAL & POWER, Blagnac (FR)

( * ) Notice: Subject to any disclaimer, the term of this patent is extended or adjusted under 35 U.S.C. 154(b) by 890 days.

(21) Appl. No.: 17/777,867

(22) PCT Filed: Nov. 19, 2020

(86) PCT No.: PCT/FR2020/052129

§ 371 (c)(1),
(2) Date: May 18, 2022

(87) PCT Pub. No.: WO2021/099743

PCT Pub. Date: May 27, 2021

(65) Prior Publication Data

US 2023/0018527 A1 Jan. 19, 2023

(30) Foreign Application Priority Data

Nov. 20, 2019 (FR) ...................................... 1912975

(51) Int. Cl.
*H01F 38/18* (2006.01)
*H01F 27/24* (2006.01)
(Continued)

(52) U.S. Cl.
CPC ............. *H01F 30/12* (2013.01); *H01F 27/24* (2013.01); *H01F 27/28* (2013.01)

(58) Field of Classification Search
CPC .......... H01F 30/12; H01F 27/24; H01F 27/28; H01F 38/18; H01F 27/38; H01F 27/289
See application file for complete search history.

(56) References Cited

U.S. PATENT DOCUMENTS 5,347,256 A * 9/1994 Yumiki .................... G11B 5/53 336/120
5,572,178 A * 11/1996 Becker .................... H01F 38/18 336/120
(Continued)

FOREIGN PATENT DOCUMENTS

WO WO 2009/128724 A1 10/2009
WO WO 2013/167828 A1 11/2013

OTHER PUBLICATIONS

International Search Report mailed on Feb. 15, 2021 in PCT/FR2020/052129 filed on Nov. 19, 2020 (5 pages).

*Primary Examiner* — Mang Tin Bik Lian
(74) *Attorney, Agent, or Firm* — Oblon, McClelland, Maier & Neustadt, L.L.P.

(57) ABSTRACT

A three-phase rotary transformer includes a first, a second and a third primary coil respectively associated with a first, a second and a third secondary coil. The second primary and secondary coils each include a first and a second sub-coil. Each of the first and third coils are housed with a respective sub-coil of the second coil respectively in a first and in a second housing of a slot of a magnetic body. For each slot, the housing corresponding to a sub-coil, has an axial dimension greater than an axial dimension of the housing corresponding to the corresponding coil.

9 Claims, 5 Drawing Sheets

(51) Int. Cl.
*H01F 27/28* (2006.01)
*H01F 30/12* (2006.01)

(56) References Cited

U.S. PATENT DOCUMENTS

| | | | | |
|---|---|---|---|---|
| 6,388,548 | B1 * | 5/2002 | Saito | H01F 38/18<br>336/131 |
| 2010/0225433 | A1 * | 9/2010 | Dunlap | H01F 38/18<br>29/605 |
| 2011/0050377 | A1 | 3/2011 | Bjerknes et al. | |
| 2011/0057758 | A1 * | 3/2011 | Dunlap | H01F 27/325<br>336/131 |
| 2015/0124509 | A1 * | 5/2015 | Duval | H02M 5/14<br>363/153 |
| 2015/0137924 | A1 | 5/2015 | Duval | |
| 2015/0145626 | A1 * | 5/2015 | Duval | H01F 30/12<br>336/5 |
| 2015/0206652 | A1 * | 7/2015 | Duval | H01F 30/14<br>336/5 |

* cited by examiner

ROTARY TRANSFORMER AND ROTATING MACHINE COMPRISING SUCH A ROTARY TRANSFORMER

TECHNICAL FIELD

The invention relates to the field of rotary transformers and rotating machines comprising such a transformer.

Thus, the invention more particularly relates to an optimized compact rotary transformer and a rotating machine comprising such a rotary transformer.

PRIOR ART

A rotary transformer 2 is a transformer making it possible to transfer electrical energy between two components 4, 5 rotating relative to each other, such as between a stator part 5 and a rotor part 4 of a rotary machine 1. This type of transformer, in the context of a three-phase rotary transformer 2 and a conventional configuration, comprises:

- at least a first, a second and a third primary coil 11, 12, 13,
- a first, a second and a third secondary coil 21, 22, 23 respectively corresponding to the first, second and third primary coils 11, 12, 13,
- a primary body 30 of ferromagnetic material and forming a solid of revolution around an axis of revolution 3, and
- a secondary body 40 of ferromagnetic material and forming a solid of revolution, the secondary body 40 being concentric with the primary body 30 such that one of the primary body 30 and the secondary body 40 is rotatable around the other of the primary body 30 and the secondary body 40 by rotating around the axis of revolution 2.

The primary body 30 comprises a first, a second and a third slot 31, 32, 33 that open facing the secondary body 40 and in which are respectively arranged the first, the second and the third primary coil 11, 12, 13.

The secondary body 40 comprises a first, a second and a third secondary slot 41, 42, 43 that open facing respectively the first, the second and the third primary coil 11, 12, 13. The first, the second and the third secondary coil 21, 22, 23 are respectively arranged in the first, the second and the third secondary slot 41, 42, 43.

In this way, it is possible to transfer the current of each of the phases of the primary individually, from a primary coil to the corresponding secondary coil and thus transfer electrical power to the part 4 of the rotary machine equipped with the secondary coils 21, 22, 23 from the part 5 equipped with the primary coils 11, 12, 13. Nevertheless, such a rotary transformer 2 has the drawback of generally comprising particularly high mass and volume.

Thus, in order to limit the volume and the mass of such a transformer 102, it has been proposed by document WO 2013167827, as shown in its FIG. 3, to:

- divide each of the first, second and third primary and secondary coils into a first and a second sub-coil,
- associate a sub-coil of each of the second and the third primary coil with respectively the first and the second sub-coil of the first primary coil, this being in a slot in common of the primary body, the other sub-coil of each of the second and the third primary coil being housed in a slot specific to itself,
- associate a sub-coil of each of the second and the third secondary coil with respectively the first and the second sub-coil of the first secondary coil, this being in a slot in common of the primary body, the other sub-coil of each of the second and the third secondary coil being housed in a slot specific to itself.

With such a configuration, with an adapted winding direction of each of the sub-coils, it is possible to obtain optimized coupling of the fluxes that enables the dimensioning of the transformer to be reduced in terms of volume and mass.

It is noticeable that it is this same approach that is disclosed by document WO 2013/167829 in a configuration from three-phase to two-phase.

In order to optimize the configuration disclosed by document WO 2013/167827, document WO 2013/167828 proposes, as illustrated in FIGS. 2 and 3, to optimize the coupling of flux by associating the second secondary coil 112, in the form of a first secondary sub-coil 112A and of a second primary sub-coil 112B, with each of the first primary coil 111 and the third primary coil 113 and by applying a similar configuration to the secondary coils 121, 122, 123.

In such a configuration, the first primary sub-coil 112A and the first primary coil 111 are housed in a first slot 131 of the primary body 130 and the second primary sub-coil 112B and the third primary coil 113 are housed in a second slot 132 of the primary body 130. The secondary body 140 has a similar conformation with the first secondary sub-coil 122A and the first secondary coil 121 thus being housed in a first slot 141 of the secondary body 140 and the second secondary sub-coil 122B and the third secondary coil 123 being housed in a second slot 142 of the secondary body 140.

It will be noted that in such a configuration, in order to balance the transformation factor of each of the phases, each of the first sub-coil 112A and of the second sub-coil 112B necessarily has the same number of turns as the first primary coil 111 and as the third primary coil 113. Thus, in order for each of the first, second and third primary coils 111, 112, 113 to have a same resistance, the first and second sub-coils 112A, 112B have a thickness 2h twice the thickness h of the first and third primary coils 111, 113, this being for an axial dimension L identical between the first and second primary sub-coils 112A, 112B and the first and third primary coils 111, 113.

Of course, as the configuration is similar for the secondary coils 121, 122, 123, this dimensioning of the primary sub-coils 112A, 112/primary coils 111, 113 also applies to them.

From this difference in thickness, also present for the secondary coils 121, 122, 123 which share a similar configuration, there results magnetic leakage fluxes that are high and imbalanced between the coils/sub-coils. This imbalance in leakage flux of the coils/sub-coils leads to an electrical imbalance between the phases, generally greater than 5%, which reduces the interest of the configuration proposed by document WO 2013/167828.

DISCLOSURE OF THE INVENTION

The invention has the object of overcoming the above drawback and is thus directed to providing a three-phase rotary transformer that is optimized and that can be electrically balanced while keeping the reduced dimensions provided by the three-phase rotary transformers of the prior art.

To that end the invention concerns a three-phase rotary transformer comprising:

- at least a first, a second and a third primary coil,
- a first, a second and a third secondary coil respectively corresponding to the first, second and third primary coils, a primary body of ferromagnetic material and forming a solid of revolution around an axis of revolution, and a secondary body of ferromagnetic material and forming a solid of revolution, the secondary body being concentric with the primary body such that one of the primary body and the secondary body is rotatable around the other of the primary body and the secondary body by rotating around the axis of revolution, the second primary coil comprising at least a first and a second primary sub-coil and the second secondary coil comprising at least a first and a second secondary sub-coil, in which the primary body comprises a first primary slot and a second primary slot each having an opening that opens facing the secondary body and the secondary body comprises a first secondary slot and a second secondary slot each having an opening that opens respectively facing the first primary slot and the second primary slot, in which the first and the second primary slot each comprise a first annular housing and a second annular housing following in succession radially from the opening of said primary slot, the first and the second secondary slot each comprising a first annular housing and a second annular housing following in succession radially from the opening of said secondary slot, the first primary slot housing the first primary sub-coil and the first primary coil, the first primary sub-coil being arranged in one of the first and the second housing of the first primary slot, the first primary coil being arranged in the other of the first and the second housing of the first primary slot, the second primary slot housing the second primary sub-coil and the third primary coil, the second primary sub-coil being arranged in one of the first and the second housing of the second primary slot, the third primary coil being arranged in the other of the first and the second housing of the second primary slot, the first secondary slot housing the first secondary sub-coil and the first secondary coil, the first secondary sub-coil being arranged in one of the first and the second housing of the first secondary slot, the first secondary coil being arranged in the other of the first and the second housing of the first secondary slot, the second secondary slot housing the second secondary sub-coil and the third secondary coil, the second secondary sub-coil being arranged in one of the first and the second housing of the second secondary slot, the third secondary coil being arranged in the other of the first and the second housing of the second secondary slot, in which for the first primary slot and the second primary slot, the housing of the first and the second housing that houses a primary sub-coil has an axial dimension greater than the other housing of the first and the second housing, and in which for the first primary slot and the second primary slot, the housing of the first and the second housing that houses a secondary sub-coil has an axial dimension greater than the other housing of the first and the second housing.

With such a conformation of the three-phase rotary transformer, it is possible to adapt the configuration for the first and second primary sub-coils and of the first and third primary coils in order to balance the leakage magnetic fluxes and thereby optimize the transformation ratio between the different phases. It is thus possible to provide an optimized three-phase rotary transformer of smaller dimensions relative to three-phase rotary transformers of the prior art.

Of course, it will be noted that, in accordance with the rules of construction of a three-phase rotary transformer, the first, second and third primary coils have the same resistance and that the first and second primary sub-coils and the first and third primary coils have the same number of turns.

Thus, with such an axial dimension of the housing of each of the sub-coils, and thus of the primary sub-coils themselves, greater than that of the housings of the second and third primary coils, and thus of the second and third primary coils, the radial dimension of these same housings of each of the sub-coils, and thus of the sub-coils, is less than twice that of the housings of the first and third primary coils, and thus of those same primary coils.

The above indications concerning the dimensioning of the housings of the primary sub-coils and of the first and third primary coils also apply to the dimensioning of the housings of the secondary sub-coils and of the first and third secondary coils.

The first and second primary sub-coils may each be housed in the respective first housing of the first and second primary slots, the first and second secondary sub-coils each being housed in the first respective housing of the first and second secondary slot.

Such a configuration enables easy manufacturing of the rotary transformer according to the invention.

Each of the first and second housings of each of the first primary slot, of the second primary slot, of the first secondary slot and of the second secondary slot may moreover have an axial dimension, the housing of the first and second housing of each of the first and second primary slots housing a sub-coil of the second primary coil having:

an axial dimension which is equal to $r^2$ times the axial dimension of the other housing of the first and the second housing, and a radial dimension which is equal to $2/r^2$ times the radial dimension of the other housing of the first and the second housing, r being what is referred to as a balancing factor of magnetic fluxes Such a configuration makes it possible to ensure a good current balance between the first, second and third coils of the primary and between those of the secondary.

The flux balance factor may be determined so as to balance the currents between the first, second and third primary coils and between the first, second and third secondary coils.

Thus, the balancing between the phases is optimized.

Such balancing may in particular be carried out so as to obtain a difference in current between each of the phases of the primary and between each of the phases of the secondary less than 5%, or optionally 2% and still more advantageously less than or equal to 1%.

the first and the second housing of the first and the second primary slot may be accommodated in a cavity of said primary slot, said cavities of the first and the second primary slot each having an axial dimension equal to the axial dimension of the housing of said primary slot of said first and said second housing which house a primary sub-coil and comprising a wall of ferromagnetic material so as to axially delimit the other housing of said first and said second housing, in which the first and the second housing of the first and the second secondary slot are accommodated in a cavity of said slot, said cavities of the first and the second secondary slot each having an axial dimension equal to that of the housing of said first and said second housing which house a secondary sub-coil and comprising a wall of ferromagnetic material so as to axially delimit the other housing of said first and said second housing.

In a half-view in axial cross-section, the primary body may have:

a central part axially dimensioned to fully accommodate the housings of the first and of the second primary slot which do not house any primary sub-coil, the housings of the first and of the second primary slot which house a primary sub-coil being partly accommodated in said central part, a first and a second axial shoulder extending axially and respectively on opposite sides of the central part and being dimensioned to accommodate part of each housing of the first and of the second primary slot which is not accommodated in the central part.

in a half-view in axial cross-section, the secondary body having:

a central part axially dimensioned to fully accommodate the housings of the first and of the second secondary slot which do not house any secondary sub-coil, the housings of the first and of the second secondary slot which house a secondary sub-coil being partly accommodated in said central part, a first and a second axial shoulder extending axially and respectively on opposite sides of the central part and being dimensioned to accommodate part of each housing of the first and of the second secondary slot which is not accommodated in the central part.

With such a configuration, it is possible to optimize the dimensions of the primary and secondary bodies and thus of the transformer.

The invention furthermore concerns a rotating machine comprising a stator, a rotor and a transformer according to the invention and the primary body being comprised in one of the stator and the rotor, the secondary body being comprised in the other of the stator and the rotor.

Such a rotating machine benefits from the advantages associated with the transformer according to the invention which it is equipped with.

The rotating machine may be a turbomachine.

The primary body may be comprised in the stator, the secondary body being comprised in the rotor, and the first, second and third secondary coils supplying a blade de-icing circuit of at least one of an intake and of an outlet nozzle of the turbomachine.

Such a turbomachine, in particular in this application to the blade de-icing circuit, benefits particularly from the improvement in the balancing of the currents of the phases of the secondary, and of those of the phases of the primary, while maintaining the contained dimensions of the prior art.

BRIEF DESCRIPTION OF THE DRAWINGS

The present invention will be better understood on reading the description of example embodiments given purely by way of indication and which is in no way limiting, with reference to the accompanying drawings in which.

Figure 1:
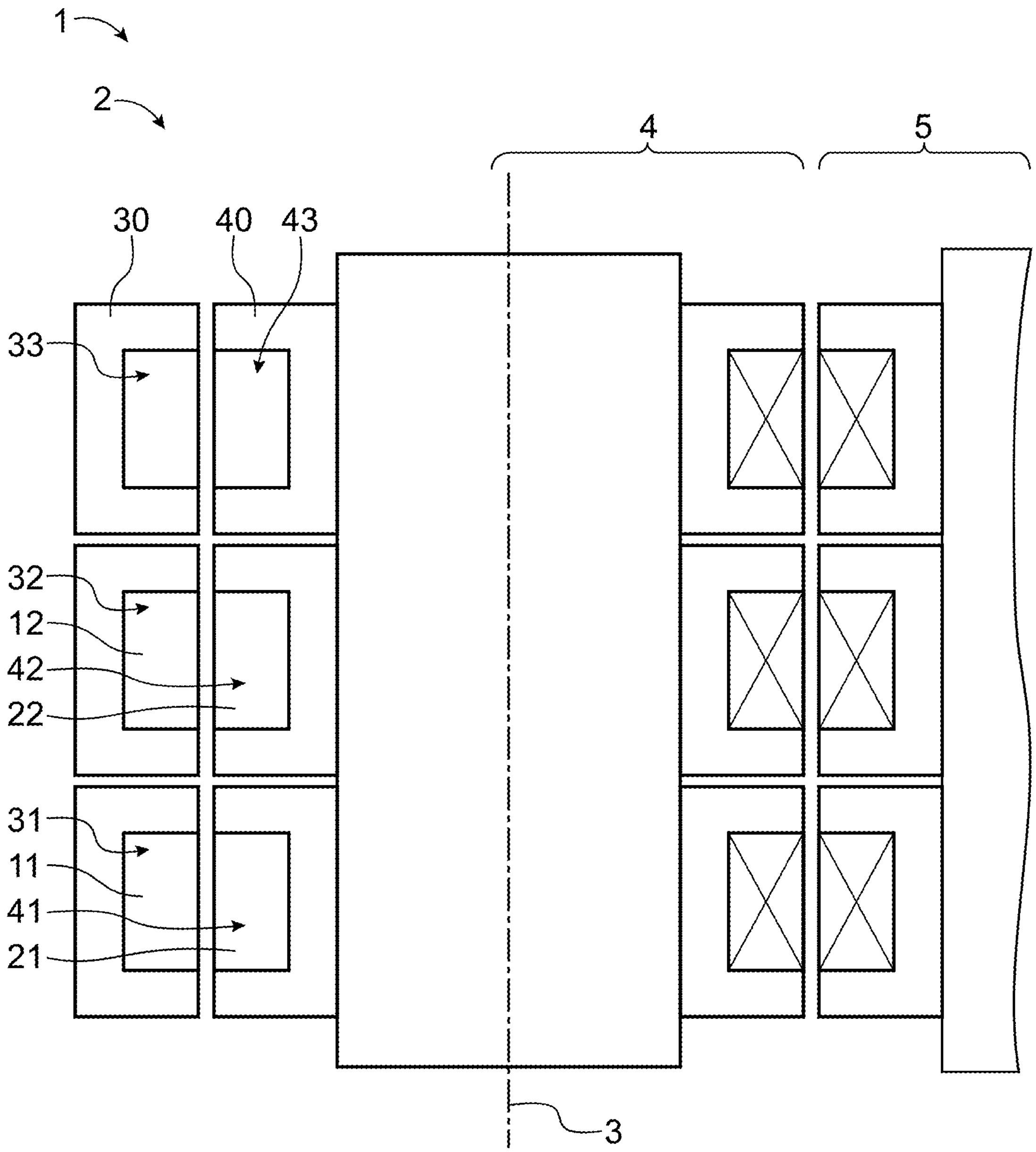
PRIOR ART FIG.1
FIG. 1 is a diagrammatic cross-section view illustrating a three-phase rotary transformer of the prior art.

Parts that are identical, similar or equivalent of the various drawings bear the same numerical references so as to facilitate the passage from one drawing to the other. The various parts shown in the drawings are not necessarily at a uniform scale, so as to render the drawings easier to read.

The various possibilities (variants and embodiments) must be understood as not being exclusive of each other and may be combined between each other.

DESCRIPTION OF THE EMBODIMENTS

Figure 3:
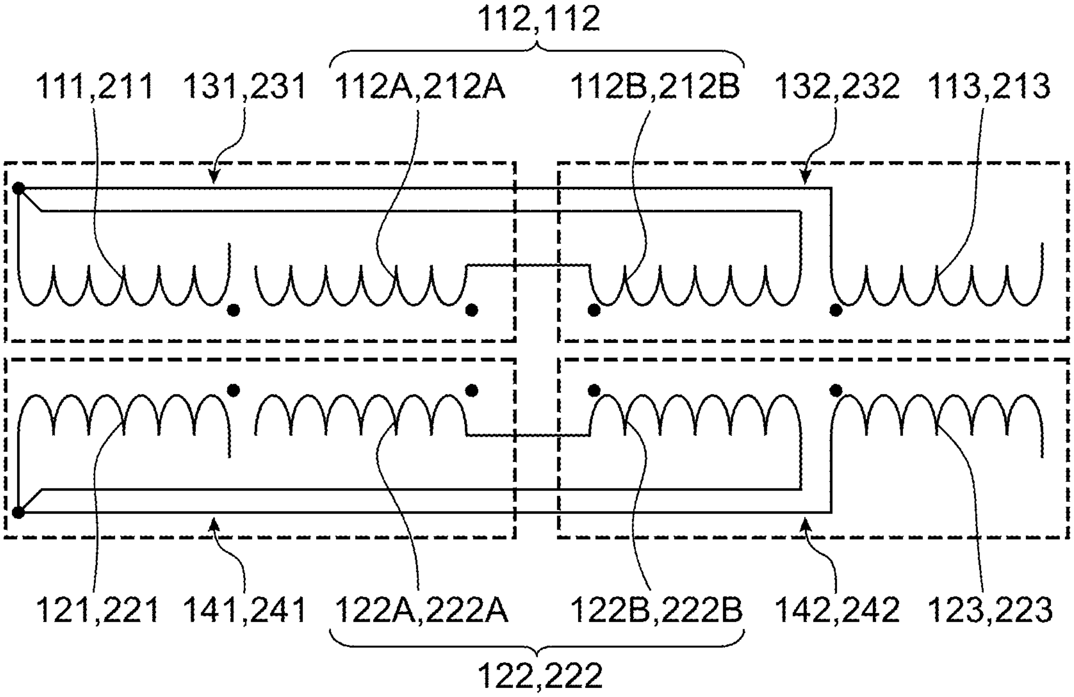
FIG. 3 illustrates the association of the primary and secondary coils of a three-phase rotary transformer according to the configuration in common between the inventors' proposal illustrated in FIG. 2 and according to the invention.
Figure 4:
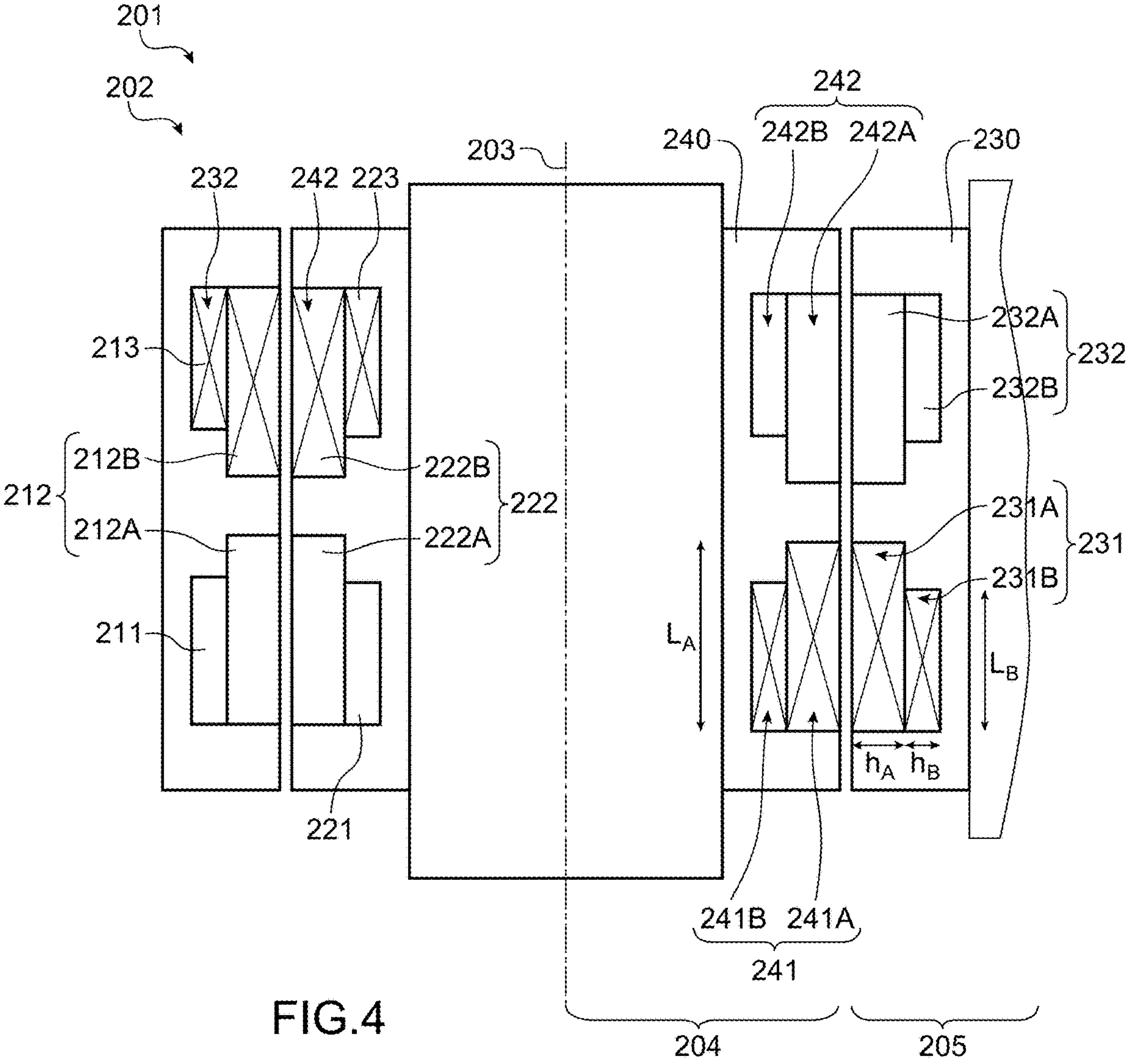
FIG. 4 is a diagrammatic cross-section view illustrating a three-phase rotary transformer according to a first embodiment of the invention.

FIGS. 3 and 4 illustrate a three-phase rotary transformer 202 according to a first embodiment, FIG. 3 illustrating the association and the winding of a first, second and third primary coil 211, 212, 213 with first, second and third secondary coils 221, 222, 223 and FIG. 4 illustrating the conformation of such a three-phase rotary transformer 202.

Such a three-phase rotary transformer 202 generally equips a rotating machine 201 such as an engine or a turbomachine and enables a transfer of electrical energy between a stator 205 and a rotor 204 mounted rotatably relative to each other around an axis of revolution 203.

Thus, as shown in FIG. 4, a three-phase rotary transformer 201 comprises:

the first, the second and the third primary coil 211, 212, 213, for example respectively corresponding to a first, a second and a third phase of a supply circuit, a first, a second and a third secondary coil 221, 222, 223 respectively corresponding to the first, second and third primary coils 211, 212, 213, said first, second and third secondary coil 221, 222, 223 for example respectively corresponding to a first, a second and a third phase of a load circuit to be supplied with current.

a primary body 230 of ferromagnetic material and forming a solid of revolution around an axis of revolution 203, and a secondary body 240 of ferromagnetic material and forming a solid of revolution, the secondary body 240 being concentric with the primary body 230 such that one of the primary body 230 and the secondary body 240 is rotatable around the other of the primary body 230 and the secondary body 240 by rotating around the axis of revolution 203.

It may be noted that in the present embodiment, it is the primary body 230 which is rotatable around the secondary body 240, the primary body 230 being included in the stator 205 and the secondary body 240 being included in the rotor 204.

As illustrated in FIGS. 3 and 4, the second primary coil 212 comprises a first and a second primary sub-coil 212A, 212B and the second secondary coil 222 comprising a first and a second secondary sub-coil 222A, 222B.

The primary body 230 comprises a first primary slot 231 and a second primary slot 232 each having an opening that opens facing the secondary body 240. The secondary body 240 comprises a first secondary slot 241 and a second secondary slot 242 each having an opening that opens respectively facing the first primary slot 231 and the second primary slot 232.

As shown in FIGS. 3 and 4, the first primary slot 231 houses the first primary sub-coil 212A, and the first primary coil 211 while the second primary slot houses the second primary sub-coil 212B, and the third primary coil 213.

In similar manner, the first secondary slot 241 houses the first secondary sub-coil 222A, and the first secondary coil 221 while the second secondary slot houses the second secondary sub-coil 222B, and the third secondary coil 223.

In this first embodiment, as illustrated in FIG. 4, each of the first and second primary slots 231, 232 and each of first and second secondary slots 241, 242 has a toroidal shape of rectangular cross-section.

As shown in FIG. 4 the first and the second primary slot 231, 232 each comprise a first annular housing 231A, 232A and a second annular housing 231B, 232B following in succession radially from the opening of said primary slot 231, 232.

In this first embodiment, the first housing 231A and the second housing 231B of the first primary slot 231 respectively house the first primary sub-coil 212A and the first primary coil 211. The first housing 232A and the second housing 232B of the second primary slot 232 respectively house the second primary sub-coil 212B and the third primary coil 213.

The first and the second secondary slot 241, 242 each comprise a first annular housing 241A, 242A and a second annular housing 241B, 242B following in succession radially from the opening of said secondary slot 241, 242.

Thus, in identical manner to the first and second primary slots 231, 232, in this first embodiment, the first housing 241A and the second housing 241B of the first secondary slot 241 respectively house the first secondary sub-coil 222A and the first secondary coil 221. The first housing 242A and the second housing 242B of the second secondary slot 242 respectively house the second secondary sub-coil 222B and the third primary coil 223.

In this way, the first, second and third primary coils 211, 212, 213 and the first, second and third secondary coils 221, 222, 223 present the magnetic association illustrated in FIG. 3 with:

- the first primary sub-coil 212A and the first primary coil 211 magnetically coupled with the first secondary sub-coil 222A and the first secondary coil 221,
- the second primary sub-coil 212B and the third primary coil 213 magnetically coupled with the second secondary sub-coil 222B and the third secondary coil 223.

With such a configuration, the magnetic fluxes of the first primary sub-coil 212A and of the first primary coil 211 are coupled and the magnetic fluxes of the second primary sub-coil 212B and of the third primary coil 213 are coupled. The magnetic coupling thus being optimized, it is possible to reduce the dimensions and the mass of the primary and secondary bodies 230, 240.

As FIG. 3 shows, the direction of the windings of the first primary sub-coil 212A and of the first primary coil 211 is identical and opposite to that of the second primary sub-coil 212B and of the third primary coil 213.

In identical manner, as FIG. 3 shows, the direction of the windings of the first secondary sub-coil 222A and of the first secondary coil 221 is identical and opposite to that of the second secondary sub-coil 222B and of the third secondary coil 223.

As the first, second and third primary coils 211, 212, 213 must have a substantially identical resistance and the first and second sub-coils 212A, 212B and the first and third coils 211, 213 have the same number of turns in order to provide an identical transformation ratio for each of the phases, the dimensioning of the first and second primary sub-coils 212A, 212B is configured such that the cross-section of the conductor forming the turns of the first and second primary sub-coils 212A, 212B has an area that is doubled relative to that of the cross-section of the conductor forming the turns of the first and third primary coils 211, 213.

In similar manner, the dimensioning of the first and second secondary sub-coils 222A, 222B is configured such that the cross-section of the conductor forming the turns of the first and second secondary sub-coils 222A, 222B has an area that is doubled relative to that of the cross-section of the conductor forming the turns of the first and third primary coils 221, 223.

As shown in FIG. 4, each of the first and second housings 231A, 231B, 232A, 232B, 241A, 241B, 242A, 242B of the first and second primary slot 231, 232 and of the first and of the second secondary slot 241, 242 have a rectangular half-axial cross-section while having an axial length $L_A$, $L_B$, forming an axial dimension of said housing, and a radial height $h_A$, $h_B$ forming a radial dimension of said housing.

According to the principle of the invention and in the context of this first embodiment, for the first primary slot 231 and the second primary slot 232, the first housing 231A, 232A has an axial dimension $L_A$, that is to say the axial length greater than that same dimension, that is to say the axial length, of the second housing 231B, 232B of the first and the second primary slot 231, 232.

In identical manner, in the context of this first embodiment, for the first secondary slot 241 and the second secondary slot 242, the first housing 241A, 242A has an axial dimension $L_A$, that is to say the axial length greater than that same dimension, that is to say axial length, of the second housing 241B, 242B of the first and the second secondary slot 241, 242.

With such a difference in axial dimensioning between the first and second housings 231A, 231B, 232A, 232B, 241A, 241B, 242A, 242B, and thus between the sub-coils 212A, 212B, 222A, 222B and the coils 211, 213, 221, 223 which are housed therein, makes it possible to reduce the leakage magnetic fluxes of the sub-coils 212A, 212B, 222A, 222B relative to a sub-coil 112A, 112B, 122A, 122B which, in accordance with the disclosure of document WO 2013/167828, would be housed in a housing having an axial dimension identical to that of the corresponding first or of the third coil 111, 113. It is thus possible, in accordance with the invention, to balance the leakage magnetic fluxes of the first and second primary sub-coils 212A, 212B with the leakage fluxes of the first and third primary coils 211, 213 and to balance the leakage fluxes of the first and second secondary sub-coil 222A, 222B with the leakage fluxes of the first and third secondary coils 221, 223.

Figure 2:
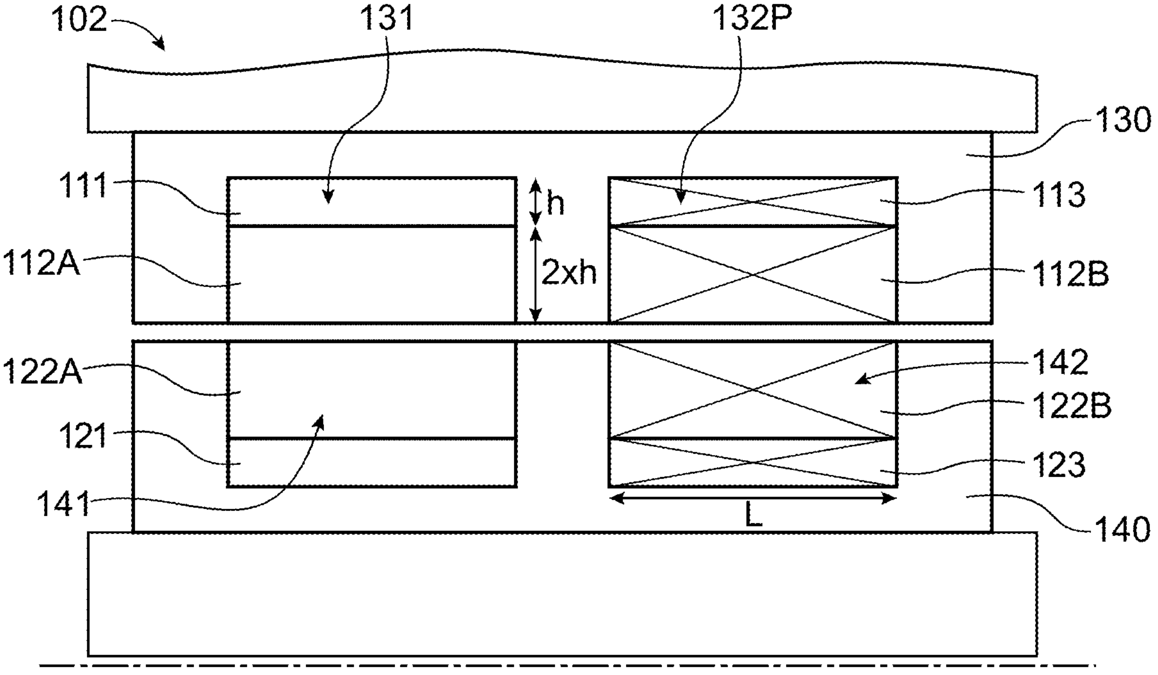
Prior Art FIG.2
FIG. 2 is a diagrammatic cross-section view illustrating a three-phase rotary transformer according to a proposal by the inventors not included within the scope of the invention.
Figure 5:
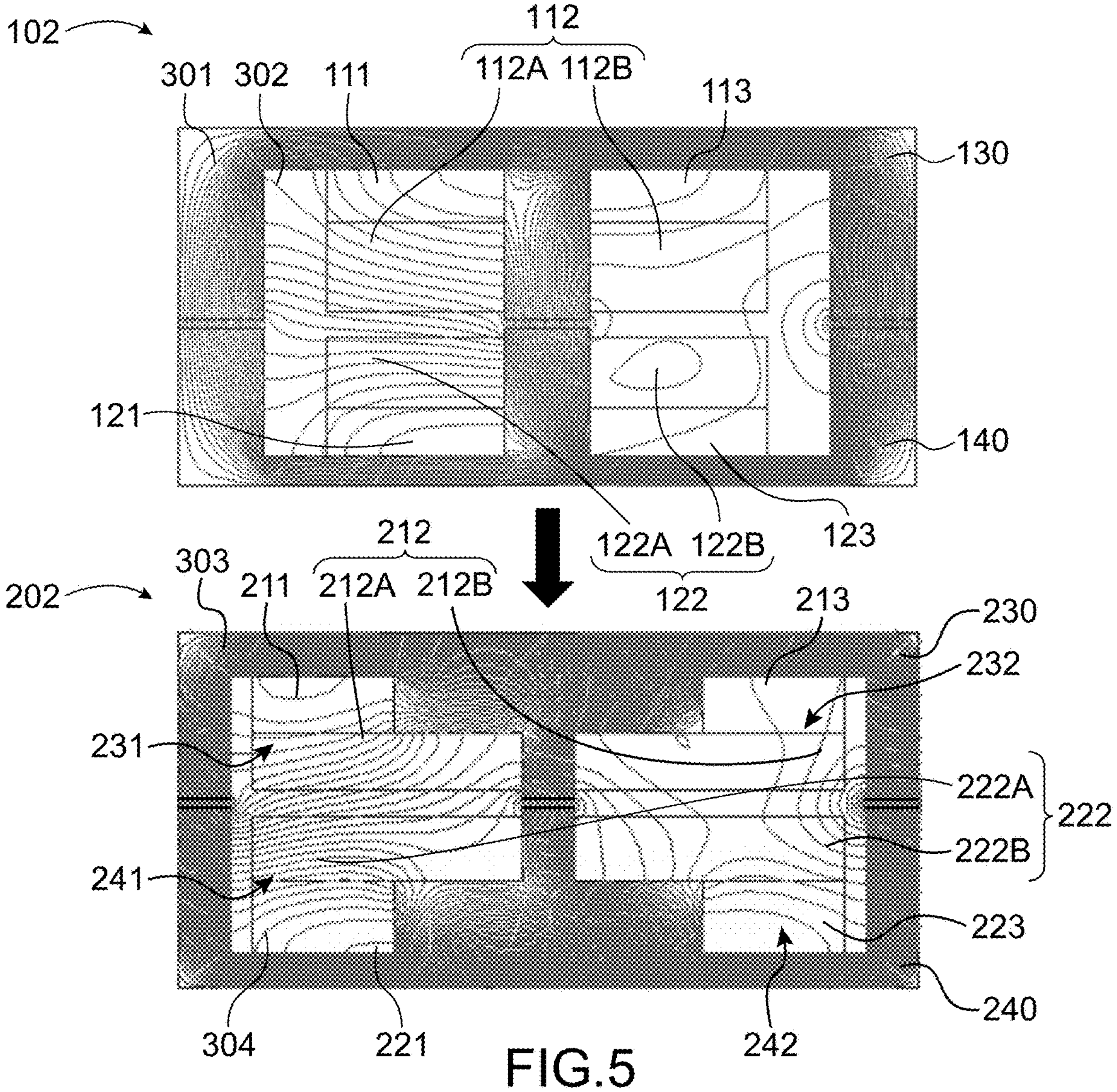
FIG. 5 illustrates the distribution of the magnetic flux respectively for a three-phase rotary transformer according to the inventors' proposal illustrated in FIG. 2 and a three-phase rotary transformer according to the first embodiment of the invention.

It is this advantage which is illustrated in FIG. 5, which shows, in the form of two axial half sections, the lines of the magnetic flux 301, 302, 303, 304 calculated by the inventors based on finite element calculation for respectively a three-phase rotary transformer 102 according to document WO 2013/197828 illustrated in FIG. 2, shown at the top of FIG. 5, the main magnetic fluxes being referenced 301 and the leakage magnetic fluxes being referenced 302, and a three-phase rotary transformer 202 according to the first embodiment of the invention illustrated in FIG. 4, shown at the bottom of FIG. 5, the main magnetic fluxes being referenced 303 and the leakage magnetic fluxes being referenced 304.

FIG. 5 thus makes it possible to show the change in the leakage fluxes between the configuration of the state of the art, corresponding to that of WO 2013/197828, shown in the upper part and the configuration of the invention shown in the lower part.

It may be noted that in the context of the configuration of the prior art, the lines of leakage flux 302 from the coils 111A and 121A are mainly in relation to the lines of leakage flux 301 of the coils 112 and 122 respectively. In the configuration of the invention, it is noted that the leakage lines of flux 303 from the coils 211A and 221A are reduced relative to the coils 212 and 222. As regards the dimensioning of the first and second housings in the configuration illustrated in FIG. 4, the axial and radial dimensions $L_A$, $h_A$ of the first housings 231A, 241A and the axial and radial dimensions $L_B$, $h_B$ of the second housings 231B, 241B are in accordance with the following equations:

$$L_A \times h_A = 2L_B \times h_B \quad (1)$$

$$L_A > L_B \quad (2)$$

With $L_A$ and $h_A$ being the axial and radial dimensions of the first housing 231A, 232A, 241A, 242A of a slot 231, 232, 241, 242 and $L_B$ and $h_B$ being the axial and radial dimensions of the second housing 231B, 232B, 241B, 242B of that same slot 231, 232, 241, 242.

It will be noted that, according to one possibility for the invention, it is possible to satisfy the above equations by defining what is referred to as a balancing factor for magnetic flux r that is strictly greater than 1 and by complying with the following conditions for the first housings 231A, 232A, 241A, 242A, of each of the slots 231, 232, 241, 242:

- an axial dimension $L_A$ which is equal to $r^2$ times the axial dimension $L_B$ of the second housing 231B, 232B, 241B, 242B of said slot 231, 232, 241, 242, and
- a radial dimension $h_A$ which is equal to $2/r^2$ times the radial dimension $h_B$ of the second housing 231B, 232B, 241B, 242B of said slot 231, 232, 241, 242.

In order to illustrate the advantage of such dimensioning of the housings 231A, 231B, 232A, 232B, 241A, 241B, 242A, 242B and thus of the sub-coils 212A, 212B, 222A, 222B and coils 211, 213, 221, 223 which are housed therein, the inventors simulated the variation in the value 311, 312, 313 of the current passing in each of the primary phases for a transformer in accordance with the invention according to the balancing factor of the magnetic flux. Thus, curve 311 corresponds to the primary phase associated with the first primary coil 211, curves 312 and 313 respectively corresponding to the primary phases respectively associated with the second and the third primary coil 212, 213.

Figure 6:
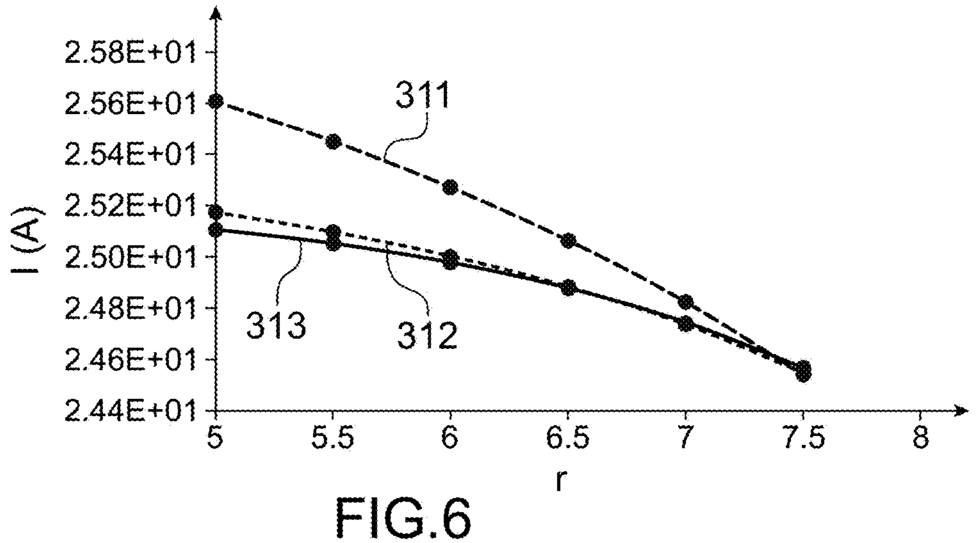
FIG. 6 illustrates the variation in the current sent into each of the secondary coils as a function of what is referred to as a magnetic flux balancing factor.

In the graph illustrated in FIG. 6, the value of the flux balancing factor has been varied starting from 5 to attain a good balance between the phases which was obtained at 7.5. It can be seen that for the smallest value of the magnetic flux balancing factor r, that is to say equal to 5, the current of the primary phase associated with the first primary coil 211 is 25.6 A while those of the primary phases associated respectively with the second and the third primary coil 212, 213 are respectively 25.2 A and 25.15 A It should be noted that for a magnetic flux balancing factor, the currents of each of the primary phases are substantially identical and equal to 24.58 A.

Figure 7:
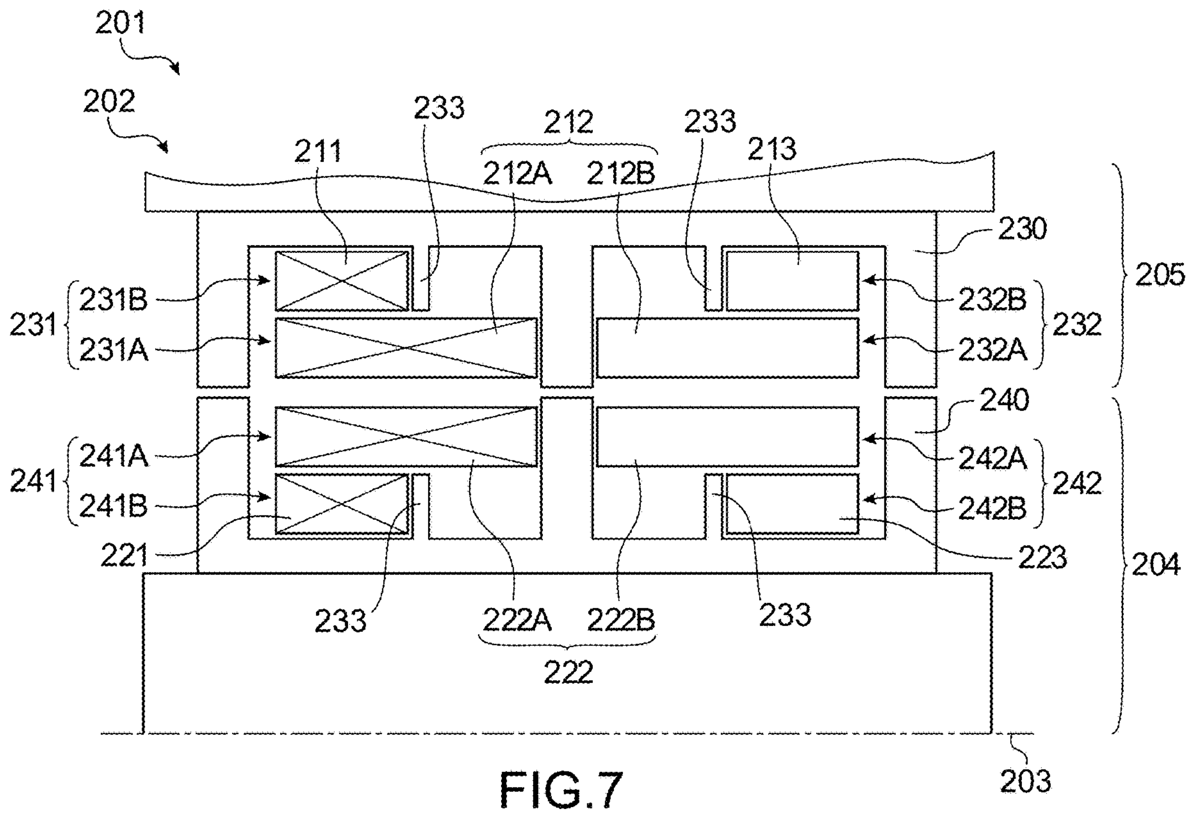
FIG. 7 is a half-axial diagrammatic cross-section view illustrating a rotary transformer according to a second embodiment of the invention.

Thus, in this example, with a magnetic flux balancing factor equal to 7.5, it is possible to have a good balance for the current between the primary phases and thus between the secondary phases of the three-phase rotary transformer 202 according to the invention. Of course, according to the principle of the invention, this balancing factor is capable of varying according to the balancing conditions sought and the configuration of the transformer and its coils 211, 212, 213, 221, 222, 223. FIG. 7 illustrates a three-phase rotary transformer 202 according to a second embodiment in which each of the primary and secondary slots 231, 232, 241, 242 has a constant axial length over the whole radial height, the housings 231B, 232B, 241B, 242B of these slots 231, 232, 241, 242 corresponding to the first and third primary coils 211, 213 and secondary coils 221, 223 being delimited by means of a wall 233 respectively of ferromagnetic material.

Thus, a three-phase rotary transformer 202 according to this second embodiment is distinguished from a three-phase rotary transformer 202 according to the first embodiment on account of the shape of the primary slots 231, 232 and secondary slots 241, 242 and on account of the fact that these latter comprise a wall 233 respectively limiting their second housing 231B, 232B, 241B, 242B.

The first and second housing 231A, 231B, 232A, 232B, 241A, 241B, 242A, 242B of the first and the second primary slot 231, 232 and of the first and second secondary slot 241, 242 are accommodated in a cavity of said corresponding primary slot 241, 242 or secondary slot 231, 232.

Said cavities of the first and of the second primary slot 231, 232 and of the first and second secondary slot 241, 242 each have an axial dimension $L_A$, that is to say an axial length, equal to the axial dimension $L_A$, that is to say an axial length, of the first housing 231A, 232A, 241A, 242A of said primary slot 231, 232 or secondary slot 241, 242. Each of the primary and secondary slots 231, 232, 241, 242 thus furthermore comprises the wall 233 of ferromagnetic material so as to axially delimit the second housing 231B, 232B, 241B, 242B.

Figure 8:
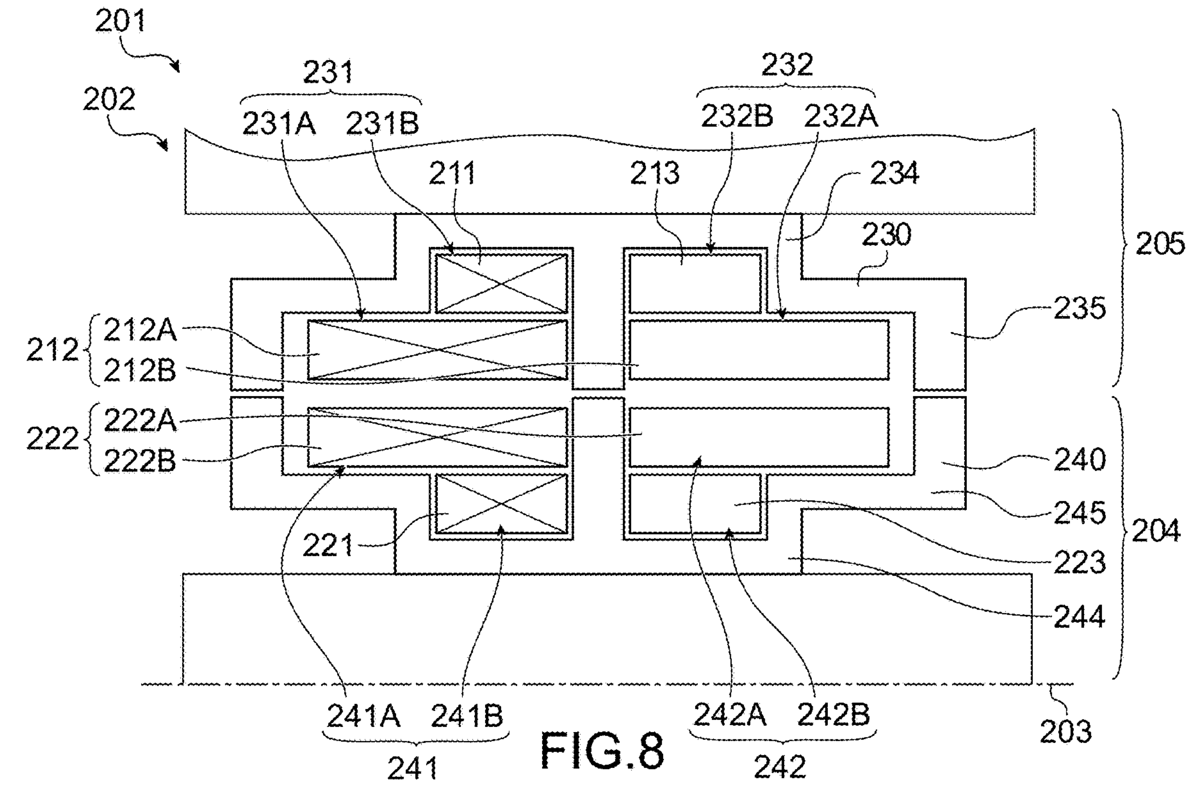
FIG. 8 is a half-axial diagrammatic cross-section view illustrating a rotary transformer according to a third embodiment of the invention.

FIG. 8 illustrates a three-phase rotary transformer 202 according to a third embodiment in which the primary body 230 and the secondary body 240 each comprise a central part 234, 244 dimensioned to fully house the second housings 231B, 232B, 241B, 242B of each of the corresponding first and second slots 231, 232, 241, 242 and partly the first housing 231A, 232A, 241A, 242A of each of said slots 231, 232, 241, 242, and two radial shoulders 235, 245 extending radially on opposite sides of the central body 234, 244 and dimensioned to house the rest of the first housings 231A, 232A, 241A, 242A which is not accommodated in the first central part 234, 244.

A three-phase rotary transformer 202 according to this third embodiment is distinguished from a three-phase rotary transformer 202 according to the first embodiment in that the primary body 230 and the secondary body 240 each have a central part 234, 244 and two axial shoulders 235, 245.

Thus, according to this third embodiment, the primary body 230 has:

a central part 234 dimensioned axially to fully accommodate the second housings 231B, 232B of the first and of the second primary slot 231, 232, the first housings 231A, 232A of the first and of the second primary slot 231, 232 being partly accommodated in said central part 234, a first and a second axial shoulder 235 extending axially and respectively on opposite sides of the central part 234 and being dimensioned to accommodate a corresponding part of a first housing 231A, 232A of the first and of the second primary slot 231, 232 which is not accommodated in the central part 234.

In identical manner, the secondary body 240 has:

a central part 244 dimensioned axially to fully accommodate the second housings 241B, 242B of the first and of the second secondary slot 241, 242, the first housings 241A, 242A of the first and of the second secondary slot 241, 242 being partly accommodated in said central part 244, a first and a second axial shoulder 245 extending axially and respectively on opposite sides of the central part 244 and being dimensioned to accommodate a corresponding part of a first housing 241A, 242A of the first and of the second secondary slot 241, 242 which is not accommodated in the central part 244.

Of course, if in each of the embodiments described above, the first housing 231A, 232A, 241A, 242A of each slot 231, 232, 241, 242 is a housing that houses a sub-coil 212A, 212B, 222A, 222B of the corresponding second coil 212, 222, the second housing 231B, 232B, 241B, 242B being a housing that houses a corresponding coil 211, 213, 221, 223, it can also be envisioned, in the context of the invention, to swap the role of the first and second housings 231A, 231B, 232A, 232B, 241A, 241B, 242A, 242B. Thus, according to such a possibility, for each slot 231, 232, 241, 242, the first housing 231A, 232A, 241A, 242A housings a coil of the corresponding first and third coils 211, 213, 221, 223 and the second housing 231B, 232B, 241B, 242B houses a sub-coil 212A, 212B, 222A, 222B of the corresponding second coil 212, 222.

According to a possible application of the invention, the rotating machine 201 may be a turbomachine, the first, second and third primary coils being respectively connected to a first, second and third phase of a three-phase circuit for supply of the turbomachine comprising an alternator of said turbomachine, the first, second and third secondary coils being respectively connected to a first, a second and a third phase of a load circuit of the turbomachine, such as a de-icing circuit for blades, such as blades of the air intake of the turbomachine.

The invention claimed is:

1. A three-phase rotary transformer comprising:

a first primary coil, a second primary coil, and a third primary coil, a first secondary coil, a second secondary coil, and a third secondary coil respectively corresponding to the first, second, and third primary coils, a primary body of ferromagnetic material and forming a solid of revolution around an axis of revolution, and a secondary body of ferromagnetic material and forming a solid of revolution, the secondary body being concentric with the primary body such that one of the primary body and the secondary body is rotatable around the other of the primary body and the secondary body by rotating around the axis of revolution;

the second primary coil comprising a first primary sub-coil and a second primary sub-coil, and the second secondary coil comprising a first secondary sub-coil and a second secondary sub-coil, wherein the primary body comprises a first primary slot and a second primary slot each having an opening that opens facing the secondary body, and the secondary body comprises a first secondary slot and a second secondary slot each having an opening that opens respectively facing the first primary slot and the second primary slot, wherein the first primary slot and the second primary slot each comprises a first annular housing and a second annular housing following in succession radially from the opening of said respective primary slot, the first secondary slot and the second secondary slot each comprising a first annular housing and a second annular housing following in succession radially from the opening of said respective secondary slot, the first primary slot housing the first primary sub-coil and the first primary coil, the first primary sub-coil being arranged in one of the first annular housing and the second annular housing of the first primary slot, the first primary coil being arranged in the other of the first annular housing and the second annular housing of the first primary slot, the second primary slot housing the second primary sub-coil and the third primary coil, the second primary sub-coil being arranged in one of the first annular housing and the second annular housing of the second primary slot, the third primary coil being arranged in the other of the first annular housing and the second annular housing of the second primary slot, the first secondary slot housing the first secondary sub-coil and the first secondary coil, the first secondary sub-coil being arranged in one of the first annular housing and the second annular housing of the first secondary slot, the first secondary coil being arranged in the other of the first annular housing and the second annular housing of the first secondary slot, the second secondary slot housing the second secondary sub-coil and the third secondary coil, the second secondary sub-coil being arranged in one of the first annular housing and the second annular housing of the second secondary slot, the third secondary coil being arranged in the other of the first annular housing and the second annular housing of the second secondary slot, wherein for the first primary slot and the second primary slot, the annular housing of the first and the second annular housing that houses a primary sub-coil has an axial dimension greater than the axial dimension of the other annular housing of the first and the second annular housing, and wherein for the first secondary slot and the second secondary slot, the annular housing of the first and the second annular housing that houses a secondary sub-coil has an axial dimension greater than the axial dimension of the other annular housing of the first and the second annular housing.

2. The three-phase rotary transformer according to claim 1, wherein the first primary sub-coil and the second primary sub-coil are each housed in the respective first annular housing of the first primary slot and the second primary slot, the first secondary sub-coil and the second secondary sub-coil each being housed in the respective first annular housing of the first secondary slot and the second secondary slot.

3. The three-phase rotary transformer according to claim 2, wherein the first annular housing and the second annular housing of the first primary slot, the first annular housing and the second annular housing of the second primary slot, the first annular housing and the second annular housing of the first secondary slot, and the first annular housing and the second annular housing of the second secondary slot each has an axial dimension, wherein the annular housing of the first and second annular housing of each of the first primary slot and the second primary slot housing the primary sub-coil or the secondary sub-coil of the second primary coil has:

the axial dimension which is equal to $r^2$ times the axial dimension of the other annular housing of the first and the second annular housing, and a radial dimension which is equal to $2/r^2$ times the radial dimension of the other annular housing of the first and the second annular housing, r being a balancing factor of magnetic fluxes.

4. The three-phase rotary transformer according to claim 3, wherein the balancing factor of magnetic fluxes is determined so as to balance currents between the first, second, and third primary coils and between the first, second, and third secondary coils.

5. The three-phase rotary transformer according to claim 1, wherein the first annular housing and the second housing of the first primary slot and the second primary slot are respectively accommodated in a cavity of said first primary slot and in a cavity of said second primary slot, said cavities of the first primary slot and the second primary slot each having an axial dimension equal to the axial dimension of the annular housing of said primary slot of said first annular housing and said second annular housing which houses the first primary sub-coil or the second primary sub-coil, and comprising a wall of ferromagnetic material so as to axially delimit the other annular housing of said first and said second annular housing, wherein the first annular housing and the second housing of the first secondary slot and the second secondary slot are respectively accommodated in a cavity of said first secondary slot and in a cavity of said second secondary slot, said cavities of the first secondary slot and the second secondary slot each having an axial dimension equal to that of the annular housing of said first and said second annular housing which houses the first secondary sub-coil or the second secondary sub-coil, and comprising a wall of ferromagnetic material so as to axially delimit the other annular housing of said first and said second annular housing.

6. The three-phase rotary transformer according to claim 1, wherein, in a half-view in axial cross-section, the primary body comprises:

a central part axially dimensioned to fully accommodate the annular housings of the first primary slot and of the second primary slot which do not house any primary sub-coil, the annular housings of the first primary slot and of the second primary slot which house the first primary sub-coil or the second primary sub-coil being partly accommodated in said central part, a first axial shoulder and a second axial shoulder extending axially and respectively on opposite sides of the central part and being dimensioned to accommodate part of each annular housing of the first primary slot and of the second primary slot which is not accommodated in the central part, and wherein, in a half-view in axial cross-section, the secondary body comprises:

a central part axially dimensioned to fully accommodate the annular housings of the first secondary slot and of the second secondary slot which do not house any secondary sub-coil, the annular housings of the first secondary slot and of the second secondary slot which house the first secondary sub-coil or the second secondary sub-coil being partly accommodated in said central part, a first axial shoulder and a second axial shoulder extending axially and respectively on opposite sides of the central part and being dimensioned to accommodate part of each annular housing of the first secondary slot and of the second secondary slot which is not accommodated in the central part.

7. A rotating machine comprising:

a stator, a rotor, and the three-phase rotary transformer according to claim 1, wherein the primary body is comprised in one of the stator and the rotor, the secondary body being comprised in the other of the stator and the rotor.

8. The rotating machine according to claim 7, which is a turbomachine.

9. The rotating machine according to claim 8, wherein the primary body is comprised in the stator, the secondary body being comprised in the rotor, and wherein the first, second and third secondary coils supply a de-icing circuit for blades of said turbomachine.

* * * * *